United States Patent
Muther

(10) Patent No.: US 9,192,940 B2
(45) Date of Patent: Nov. 24, 2015

(54) DEVICE FOR SEPARATING COMPOSITE MATERIALS

(75) Inventor: Christoph Muther, Hergiswil (CH)

(73) Assignee: ASCORE Technologies AG, Neuhausen am Rheinfall (CH)

( * ) Notice: Subject to any disclaimer, the term of this patent is extended or adjusted under 35 U.S.C. 154(b) by 175 days.

(21) Appl. No.: 13/990,418

(22) PCT Filed: Dec. 1, 2011

(86) PCT No.: PCT/IB2011/055408
§ 371 (c)(1),
(2), (4) Date: May 29, 2013

(87) PCT Pub. No.: WO2012/073216
PCT Pub. Date: Jun. 7, 2012

(65) Prior Publication Data
US 2013/0270372 A1    Oct. 17, 2013

(30) Foreign Application Priority Data
Dec. 1, 2010 (CH) .................. 2027/10

(51) Int. Cl.
*B02C 23/30* (2006.01)
*B02C 13/18* (2006.01)
(Continued)

(52) U.S. Cl.
CPC .......... *B02C 23/30* (2013.01); *B02C 13/18* (2013.01); *B02C 13/2804* (2013.01); *B02C 13/288* (2013.01); *B29B 17/02* (2013.01); *B29B 17/04* (2013.01); *B29B 2017/0224* (2013.01); *B29B 2017/0492* (2013.01); *B29K 2023/065* (2013.01); *B29K 2023/0633* (2013.01); *B29K 2223/0633* (2013.01); *B29K 2705/02* (2013.01); *B29K 2705/10* (2013.01); *B29L 2009/00* (2013.01); *B29L 2009/003* (2013.01); *B29L 2031/3425* (2013.01); *Y02W 30/523* (2015.05); *Y02W 30/622* (2015.05); *Y02W 30/625* (2015.05)

(58) Field of Classification Search
CPC ...... B02C 19/18; B02C 23/30; B02C 13/288; B02C 13/18; B02C 13/14
USPC ............ 241/1, 301, 19, 30, 47, 57, 29, 152.2, 241/260, 257.1
See application file for complete search history.

(56) References Cited

U.S. PATENT DOCUMENTS

2005/0103908 A1    5/2005    Muther et al.
2010/0282881 A1    11/2010   Pallmann

FOREIGN PATENT DOCUMENTS

DE    10 2004 001 305 A1    8/2005
GB    2 030 482 A            4/1980
WO    2006/117065 A1         11/2006

*Primary Examiner* — Mark Rosenbaum
(74) *Attorney, Agent, or Firm* — Speckman Law Group PLLC; Janet Sleath

(57) ABSTRACT

The invention relates to a novel device (10) for separating composite materials, comprising a cylindrical rotor (17), which has a shaft driven by a motor and strip-shaped first impacting tools (30), which are evenly distributed over the circumference and which protrude from the rotor parallel to the shaft, and comprising a cylindrical stator (12) that surrounds the rotor, wherein an annular space (32) is formed between the rotor and the stator. An air supply channel (15) opens into the upper region of the annular space (32) and an air removal channel (38) leads away from the lower region of the annular space. Furthermore, the cylindrical wall of the stator (12) has strip-shaped second impacting tools (31), which are evenly distributed over the circumference and which protrude radially inward.

7 Claims, 6 Drawing Sheets

(51) Int. Cl.
*B02C 13/28* (2006.01)
*B29B 17/02* (2006.01)
*B29B 17/04* (2006.01)
*B02C 13/288* (2006.01)
*B29K 23/00* (2006.01)
*B29K 705/02* (2006.01)
*B29K 705/10* (2006.01)
*B29L 9/00* (2006.01)
*B29L 31/34* (2006.01)

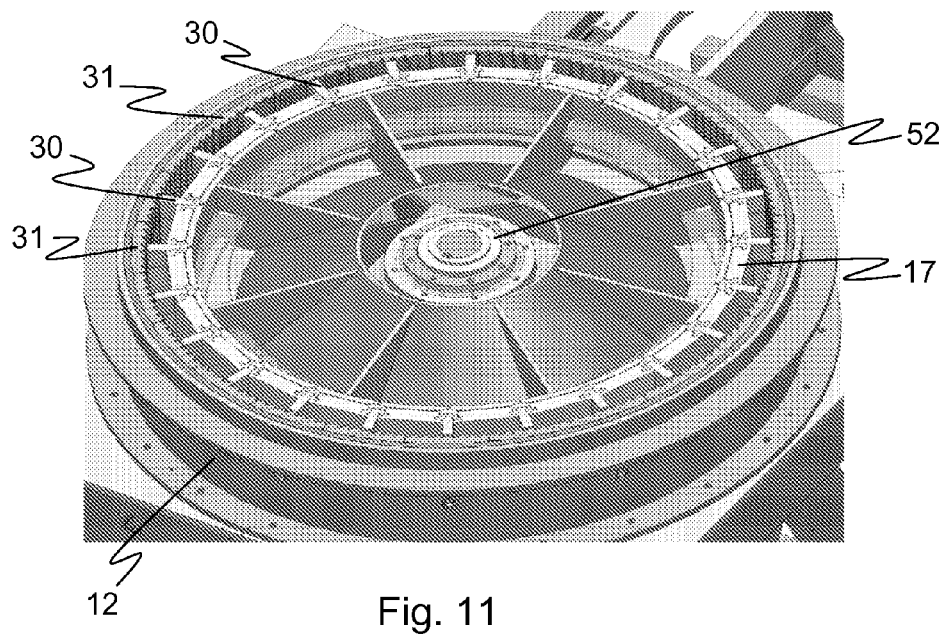
Fig. 11
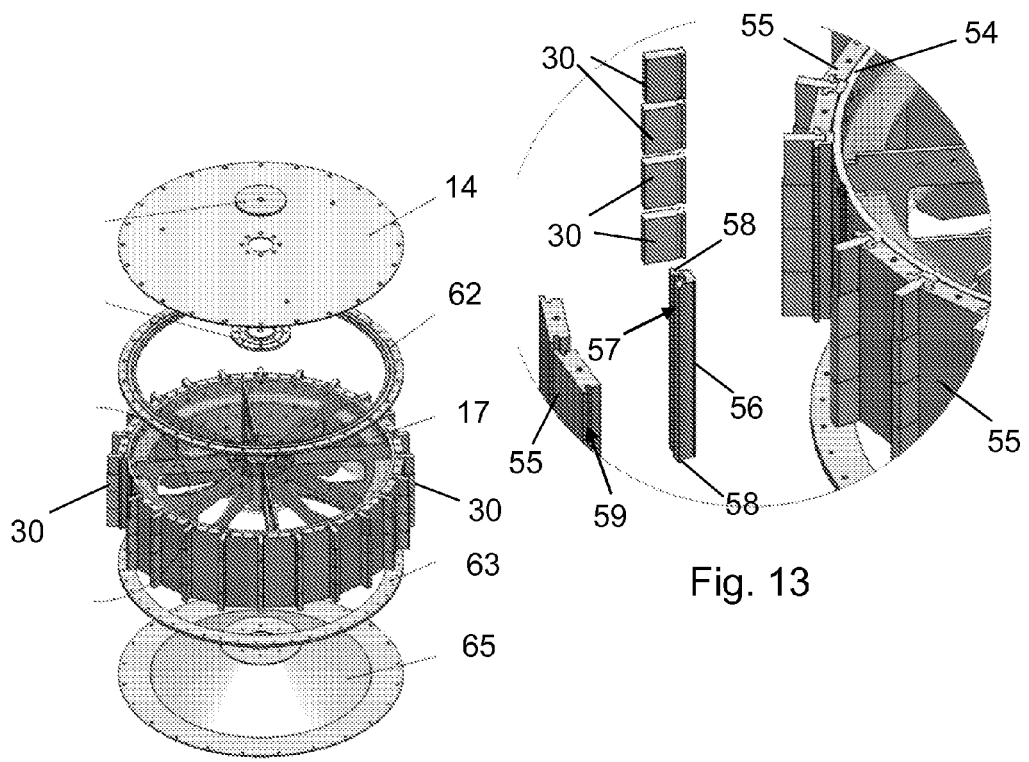
Fig. 12
Fig. 13

DEVICE FOR SEPARATING COMPOSITE MATERIALS

REFERENCE TO RELATED APPLICATIONS

This application is the US national phase entry of International Patent Application no. PCT/IB2011/055408, filed Dec. 1, 2011, which claims priority to Swiss patent application no. 2027/10, filed Dec. 1, 2010.

FIELD OF THE INVENTION

The invention relates to a device for separating composite materials having a cylindrical rotor, which has an axis of rotation driven by a motor, and strip-shaped first impact tools, which are distributed regularly around the circumference and protrude parallel to the axis of rotation from the rotor, and having a cylindrical stator enclosing the rotor, wherein a ring space is formed between rotor and stator, and having an air feed channel opening into the ring space and an air exhaust channel leading away from the ring space.

BACKGROUND

Composite materials and the mixtures thereof are very frequently used as packaging or as a structural element in construction and in mechanical engineering, for example. The physical properties of various materials are combined, in order to fulfill the desired mechanical functions. A further reason for the increasing use of composite materials is that they can be produced with lower material and energy outlay and therefore resources can be saved.

Various examples of such composite materials will now be described on the basis of following FIGS. 1 to 3.

FIG. 1 shows a composite material 1 made of a thin aluminum layer 2 of 20 to 40 µm in a sandwich with two layers 3 made of LDPE (low-density polyethylene) of 120 µm, which is used as a laminate for tubes. The aluminum is used as a barrier layer against light and prevents the diffusion of liquids and gases.

FIG. 2 shows the pattern of a printed circuit board 4 for electronic circuits, which consists of a composite of thin copper layers of 5 to 20 µm and glass-fiber-epoxy layers of 6 to 50 µm and more.

FIG. 3 shows a detail of an aluminum composite plate 7, which consists of two aluminum layers 8 of 200 to 500 µm and an interposed layer 9 made of HDPE (high-density polyethylene) of approximately 2 to 4 mm. Other plastics may also be used for this purpose. Such sandwich plates are used in facade construction or in vehicle construction.

Such composite materials cause great problems in the case of disposal, since precise separation of the individual materials is hardly possible. In rare cases, the composite materials are processed by means of thermal or wet-chemistry processes. These processes are typically not very efficient and substantially stress the environment. In addition, the recycled materials are frequently produced in inadequate quality. Another possibility is to crush the composite materials and mechanically separate the materials.

For example, a device for treating composite elements is known from WO-A-2006/117065, in which the composite material has been crushed to a grain size of 5 to 50 mm and the crushed particles are conducted in a feed channel to a breaking-up device. The device consists of a rotating rotor, having tools implemented as strips, which is arranged in a cylindrical stator. An air stream is conducted in the opposite direction in the ring space between rotor and stator from bottom to top, in order to discharge dust via a dust removal pipe attached on top. As the particles are broken up, they are crushed further when they impact on the strip-shaped tools, as described in greater detail in conjunction with FIG. 13. The air stream is necessary, on the one hand, to keep the particles for a sufficiently long time in the ring space and, on the other hand, to discharge the dust arising in this case upward.

Due to the air stream from bottom to top, the digested particles remain longer in the ring space than is necessary for the separation. Lighter and heavier particles thus also have a dwell time of approximately equal length in this ring space. Furthermore, the danger exists that the lighter particles will be drawn upward with the air stream, which results in further complications.

SUMMARY

The present invention is based on the object of specifying a device for separating composite materials, which separates the components with greater precision from one another, so that no dust arises.

This object is achieved by a device for separating composite materials having a cylindrical rotor, which has an axis of rotation driven by a motor, and strip-shaped first impact tools, which are distributed regularly around the circumference and protrude parallel to the axis of rotation from the rotor, and having a cylindrical stator enclosing the rotor, wherein a ring space is formed between rotor and stator, and having an air feed channel opening into the ring space and an air exhaust channel leading away from the ring space, characterized in that the air feed channel opens into the top region of the ring space and the air exhaust channel leads away from the bottom region of the ring space, and the cylindrical wall of the stator has strip-shaped second impact tools, which are distributed regularly around the circumference and protrude radially inward.

The device according to the invention has the great advantage that the particles to be treated are not crushed further or even pulverized during the separation method and therefore dust removal is completely dispensed with.

BRIEF DESCRIPTION OF THE FIGURES

Further advantages of the invention result from the dependent patent claims and from the following description, in which the invention is explained in greater detail on the basis of an exemplary embodiment shown in the schematic figures. In the figures:

FIG. 11 shows the rotor and the stator in a perspective view, FIG. 12 shows the rotor in an exploded view, FIG. 13 shows a detail view from FIG. 12.

DETAILED DESCRIPTION

Figure 1:
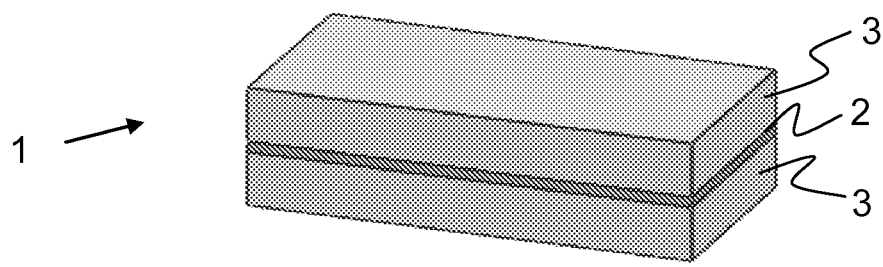
FIG. 1 shows a composite material 1 made of a thin aluminum layer 2 of 20 to 40 µm in a sandwich with two layers 3 made of LDPE (low-density polyethylene) of 120 µm, which is used as a laminate for tubes.
Figure 2:
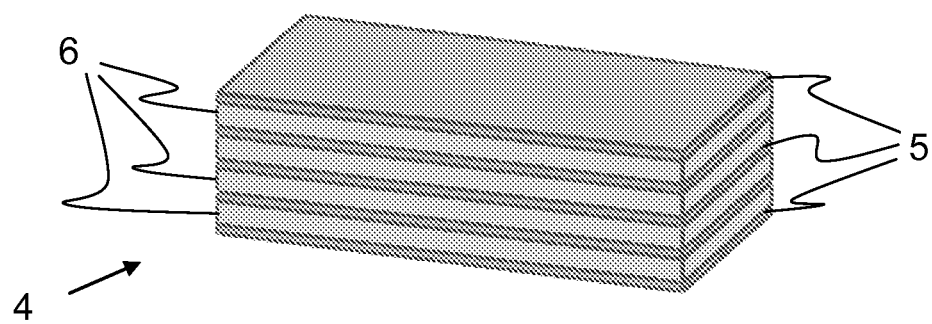
FIG. 2 shows the pattern of a printed circuit board 4 for electronic circuits, which consists of a composite of thin copper layers of 5 to 20 µm and glass-fiber-epoxy layers of 6 to 50 µm and more.
Figure 3:
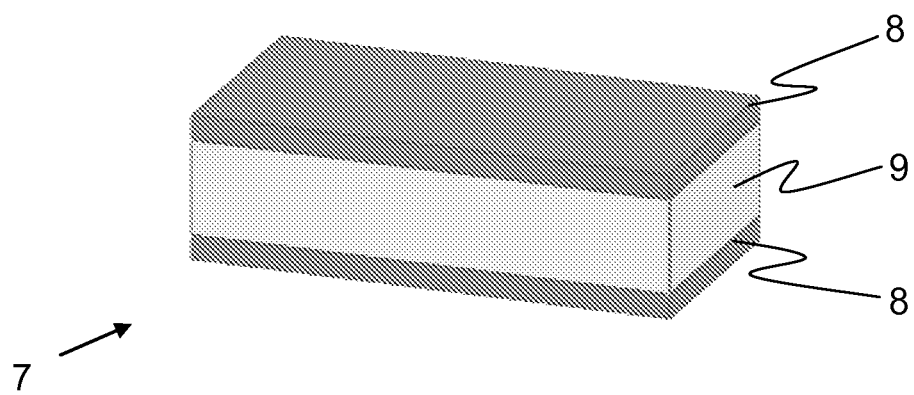
FIG. 3 shows a detail of an aluminum composite plate 7, which consists of two aluminum layers 8 of 200 to 500 µm and an interposed layer 9 made of HDPE (high-density polyethylene) of approximately 2 to 4 mm.
Figure 4:
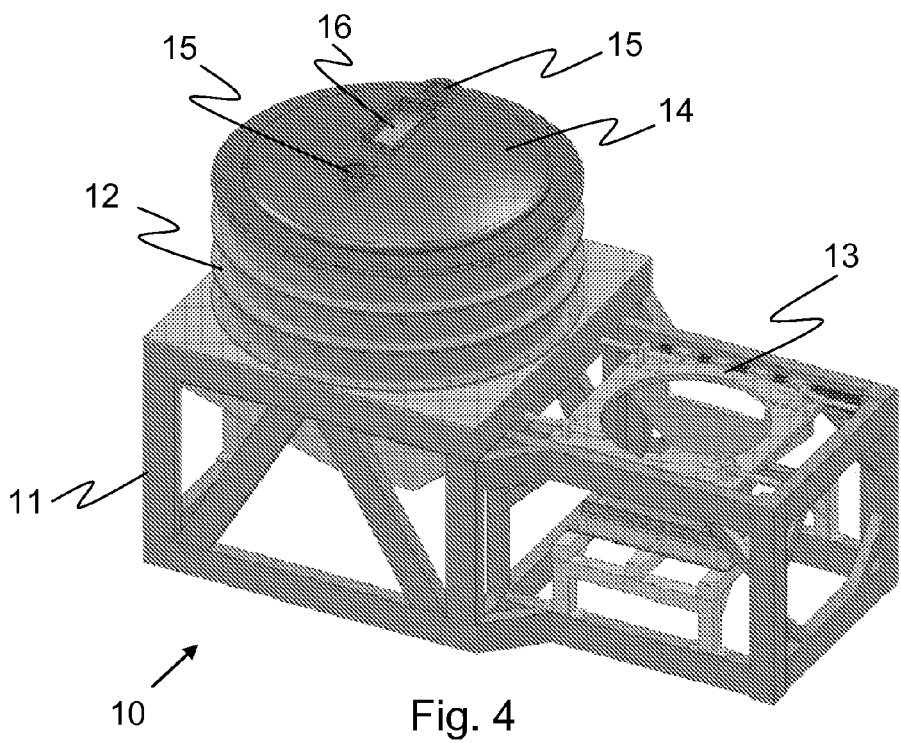
FIG. 4 shows a perspective view of a device for separating composite materials.
Figure 5:
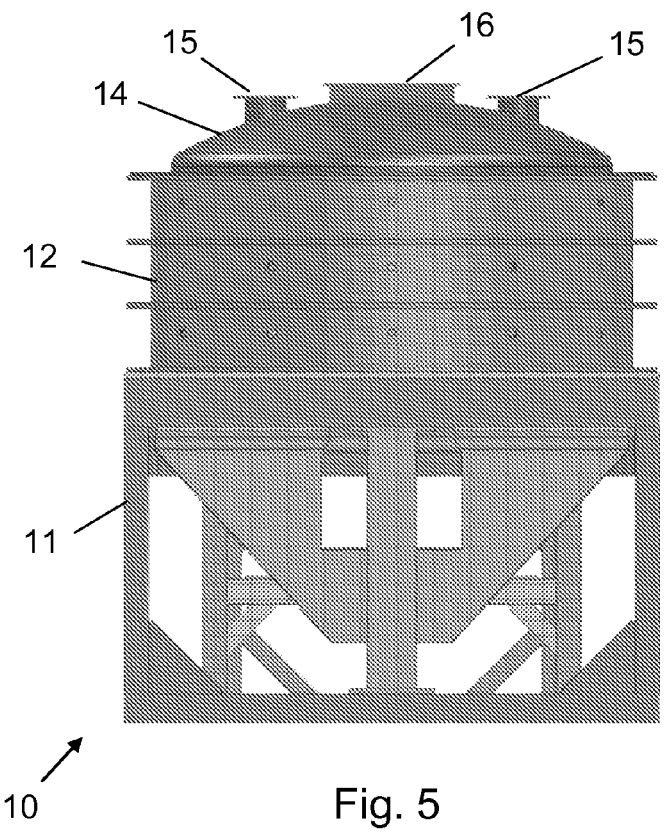
FIG. 5 shows a top view of the device.
Figure 6:
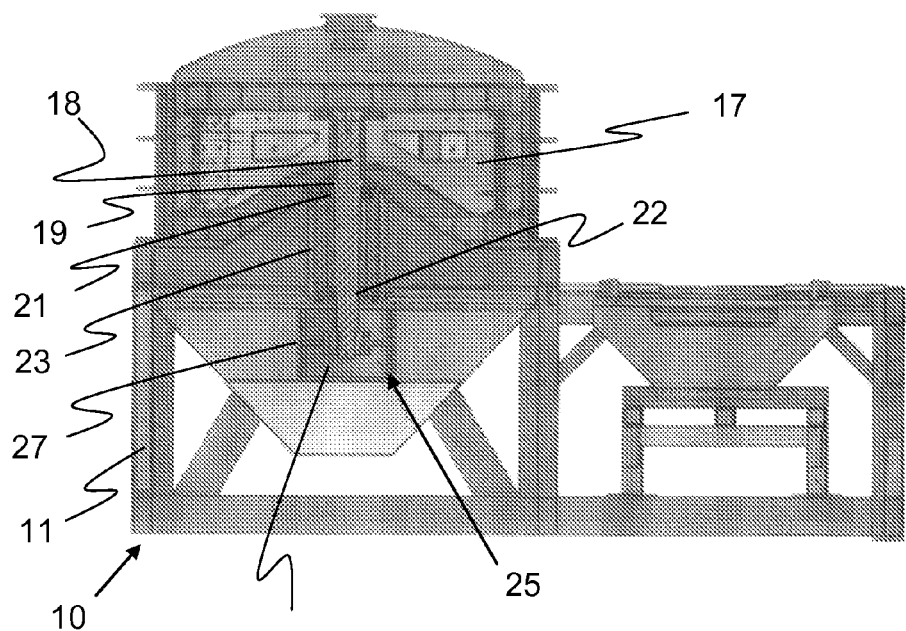
FIG. 6 shows a cross-section in the longitudinal direction through the device.
Figure 7:
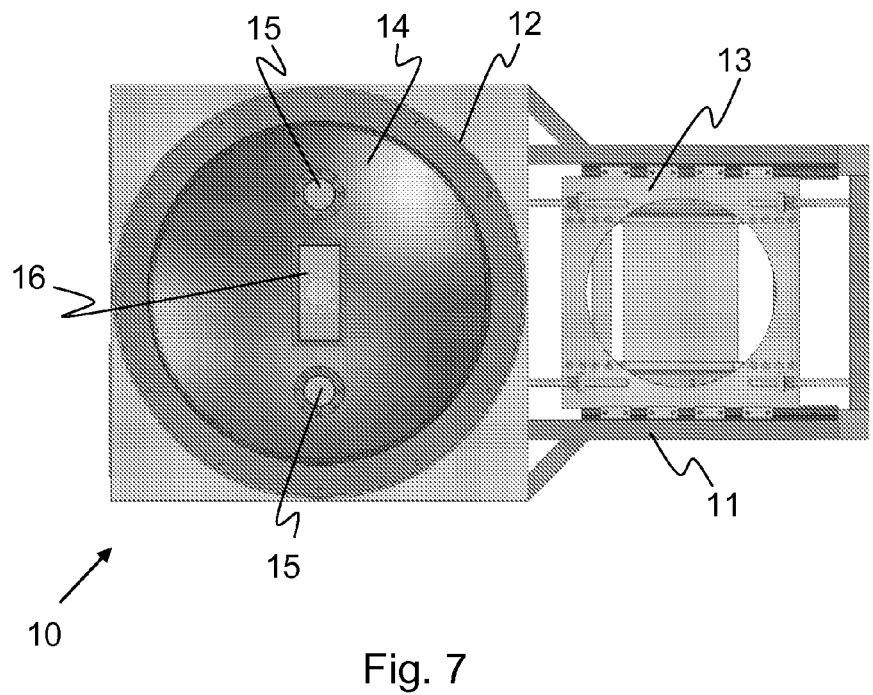
FIG. 7 shows an outline of the device.

FIGS. 4 to 7 show a device 10 for separating composite materials, which has a machine frame 11, which carries a cylindrical stator 12 and has a receptacle 13 for a drive motor (not shown). Two air inlet openings 15 and a material feed opening 16 are provided on top on the lid 14 of the device 10. As is obvious from FIG. 6, a rotor 17 is arranged so it is rotatable on a shaft 18 in the stator 12. The shaft 18 has a support ring 19 at approximately two-thirds height, on which the rotor 17 is supported. The rotor 17 is fastened using a press fit on the shaft 18. Furthermore, two bearings 21 and 22 are provided in a bush 23 on the machine frame 11, in which the shaft 18 is mounted so it is rotatable. The shaft 18 has on its bottom end 25 a drive cylinder 26 having external grooves 27, in order to be driven by means of a toothed belt (not shown) by the motor.

Figure 8:
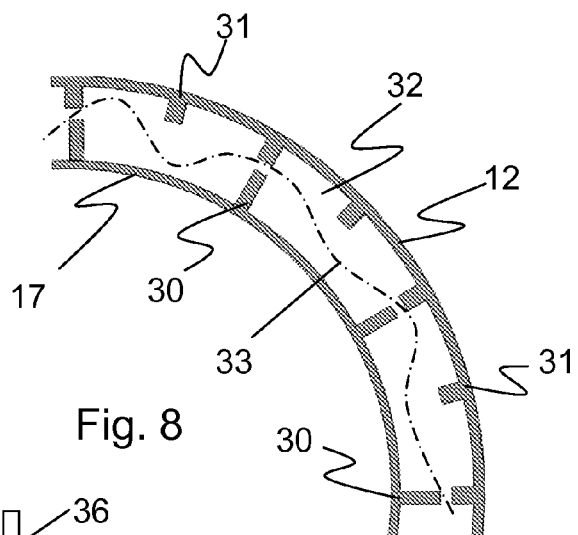
FIG. 8 shows a schematic view of a composite material and the Shockwaves generated therein.

FIG. 8 shows a part of the rotor 17 and a part of the stator 12. The rotor 17 has first tools 30 arranged regularly on its circumference, which are implemented as strips and have a height of approximately 10 to 15 mm. The stator 12 also has strip-shaped second tools 31, which have a height of approximately 5 to 8 mm, arranged regularly on its circumference. The second tools 31 are distributed in a ratio 2:1 on the interior of the circumference of the stator 12. A ring space 32, in which the particles of the composite materials to be broken up are located, is formed between the stator 12 and the rotor 17. The flight path 33 of a particle of a composite material to be broken up is shown by dashed lines. The rotor 17 rotates counterclockwise to the stator 12.

Figure 9:
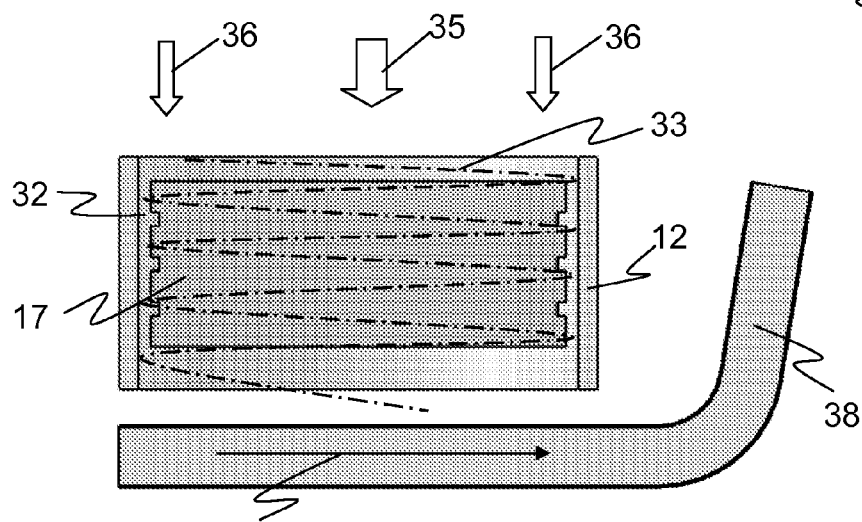
FIG. 9 shows a schematic top view of a part of the rotor and a part of the stator.

The stator 12, the rotor 17, and the helical flight path 33 in the ring space 33 are shown solely schematically in FIG. 9. The arrow 35 indicates the material feed of the composite materials to be broken up through the material feed opening 16 and the arrows 36 indicate the air feed through the air inlet openings 15 (see FIGS. 4 to 7). Due to the feed of the composite materials from the top into the device 10, the particles describe a helical path 33 from top to bottom. The velocity and the pitch can be regulated by the speed of the rotor 17 and by the air feed. After the broken-up material exits, it is conveyed further by an air stream 37 into a channel 38. The material, which is broken up into fractions, is separated therein in a known manner by means of screens, liquid bed separators, sifters, and corona separators into the individual components.

In practice, the rotor 17 is driven at a rotational velocity of 800 RPM, for example. The first strip-shaped tools 30 are thus guided past the second strip-shaped tools 31 at a very high velocity and very large forces arise on the entrained particles at the moment of passage. Due to these forces, the particles are briefly very strongly accelerated and subsequently—when the first tools 30 are located between the second tools 31—decelerated again by the rapid drop of the forces. This procedure repeats at a high frequency, which is determined by the distance between the first tools 30, the distance between the second tools 31, and the rotational velocity of the rotor 17.

Figure 10:
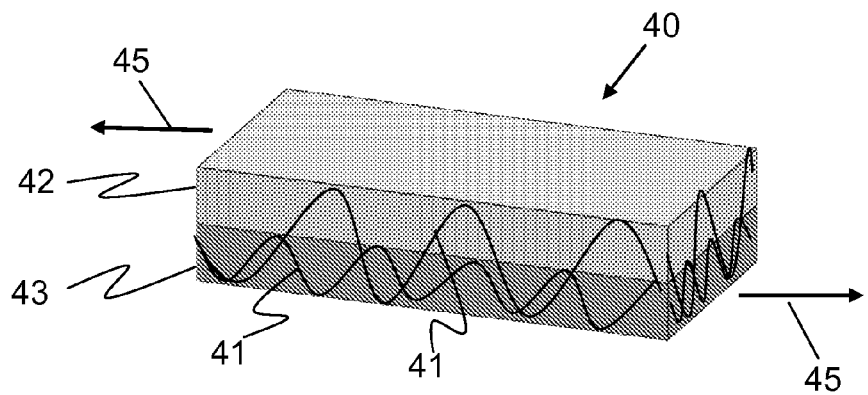
FIG. 10 shows a schematic view of the device to illustrate its function.

The forces act differently on the layers of the composite material, so that shearing occurs along the boundary between the various materials. So-called Shockwaves or transverse waves can be observed in the composite material. Since the energy is damped differently because of the different material properties such as density, elasticity, and stiffness, the materials are separated by shear forces. Plastics have a rather absorbent and vibration-damping effect and metals have more of a vibration-transmitting effect. In FIG. 10, these Shockwaves 41 are shown in a part 40 of a composite material, which consists of a PE layer 42 and an aluminum layer 43. The thrust forces on the layers 42 and 43 are indicated with the arrows 45.

The design of the device according to the invention having the air stream from bottom to top has the effect that the dwell time of the heavier particles in the ring space 33 is substantially shorter than the dwell time of the lighter particles. For example, the heavier particles, which originate from aluminum parts or copper cables, circle approximately 100 times in a spiral shape in the ring space 33, while lighter particles, which originate from circuit boards or the like, circle approximately 200 times in a spiral shape in the ring space 33. The various components of so-called electrical waste can thus be separated substantially better.

To prepare the composite materials to be separated, they are crushed before being introduced into the device 10. The material is typically crushed to a size of 5 to 50 mm. This size is dependent on the respective composite material. If the layers are relatively thin, as in the case of a tube laminate (<20 µm) and the adhesion forces are large, the composite material is crushed in the device 10 to a size of 5 to 8 mm. In the case of composite materials having a relatively thick layer (>200 µm) such as aluminum, and low adhesion forces, crushing is performed to 40 to 50 mm. The feed into the device 10 is performed continuously and can be metered.

The rotor 17 has a diameter of 1200 to 2400 mm, 2000 mm in the standard version. The internal diameter of the stator 12 is between 1250 and 2450 mm, the standard is 2050 mm. The structural height of the rotor 17 is between 375 and 625 mm, 500 mm is standard. The first and second tools 30 and 31 are typically arranged in 3 to 5 levels respectively vertically one over another, 4 levels are provided in the standard. The total number of the first tools 30 of the rotor 17 is between 50 and 150, 96 is standard. The distance between the first tools 30 of the rotor 17 and the second tools 31 of the stator is settable between 0.5 and 25 mm.

FIG. 11 is a perspective view of the stator 12 and the rotor 17 having the strip-shaped first tools 30 and the strip-shaped second tools 31. As is apparent therefrom, the strip-shaped second tools 31 are formed as wall sections held by the stator ring 12, which have a sawtooth pattern having serrated projections 51 on the inner side. In this case, there is a ratio of 1:8 between first tools 30 and projections 51 around the circumference of the rotor 17. No shaft is provided in this case, but rather a bush 52 is provided, which is fastened by spokes 53 on an outer cylinder 54. The ratio between the first and second tools 30 and 31 is preferably between 1:2 and 1:8.

FIG. 12 shows the rotor 17 in an exploded view, wherein a detail view is shown in FIG. 13. Wall elements 55 are screwed onto the outer cylinder 54, with guide rails 56 clamped in between. The guide rail 56 has a dovetail groove 57 having protruding edges 58, which fit into a groove 59 of the wall element 55. Four first tools 30 are now pushed into the guide rail 56, which have a similar dovetail profile 60 on one longitudinal edge 58. A top flange 62 is screwed on top onto the external cylinder 54 and a bottom flange 63 is screwed onto the bottom, so that the first tools 30 are fixed in the axial direction. Furthermore, the rotor 17 is protected by the top lid 14 and by a bottom cover 65 against the penetration of separated materials. First tools 30 having a greater width can be provided to reduce the distance between first tools 30 and second tools 31 if needed. The replacement of first tools 31 can be performed particularly easily due to the formation of the guide rails 56.

Figure 14:
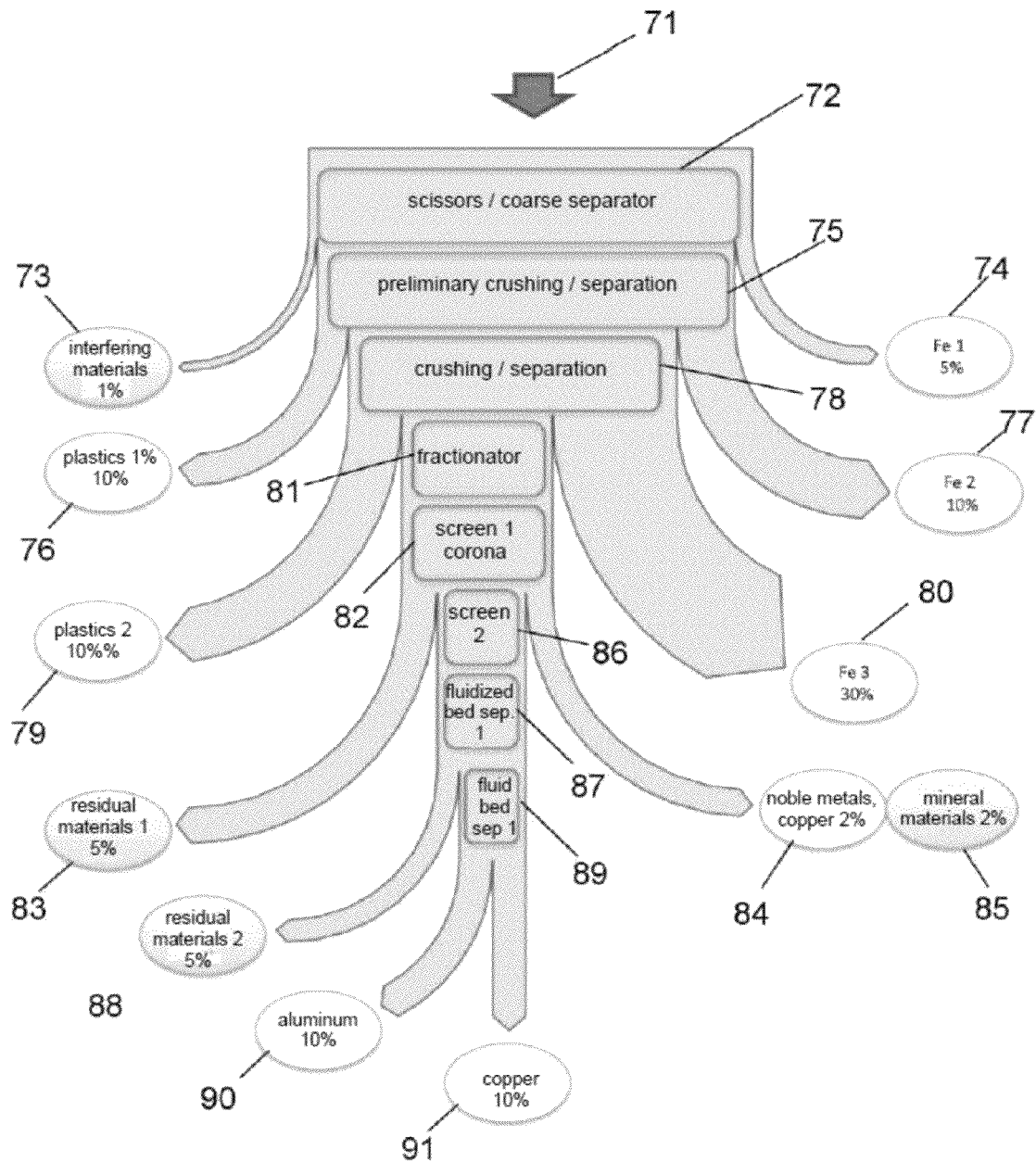
FIG. 14 shows a flow chart of the method for separation.

The precise sequence during the separation of composite materials such as electronic circuits is shown in greater detail in FIG. 14 in a flow chart. The composite materials, which are indicated with the arrow 71 and are to be separated, are first freed of interfering materials 73 and first iron parts 74 using scissors or a coarse separator 72. Preliminary crushing 75 is then performed, during which first plastics 76 and second iron parts 77 are removed. Subsequently, there is a further crushing 78, whereby second plastics 79 and third iron parts 80 are removed. In a fractionator 81, which the device 10 forms here, and a Corona separator and optionally a screen 82, residual materials 83, noble metals and copper 84, and mineral materials 85 are now removed. In a second screen 86 and a first fluidized bed separator 87, further residual materials 88 are then removed. Finally, aluminum 90 and copper 91 are obtained by a second fluidized bed separator 89.

The invention claimed is:

1. A device for separating composite materials comprising:
   (a) a cylindrical rotor, which has a vertical axis of rotation driven by a motor and strip-shaped first impact tools which are distributed regularly around a circumference of the rotor and protrude from the rotor parallel to the vertical axis of rotation;
   (b) a cylindrical stator enclosing the rotor, wherein a ring space is formed between the rotor and the stator, the stator having strip-shaped second impact tools which are distributed regularly around a circumference of the stator and protrude radially inward;
   (c) a material feed opening entering into the ring space;
   (d) an air feed channel entering into a top region of the ring space; and
   (e) an air exhaust channel leading away from a bottom region of the ring space.

2. The device according to claim 1, wherein the first impact tools are distributed in a ratio of 1:2 to 1:8 to the second impact tools around the circumference of the rotor or the stator.

3. The device according to claim 1, wherein the width of the first impact tools is twice or three times as great as the width of the second impact tools.

4. The device according to claim 1, wherein the distance between the first impact tools and the second impact tools is between 2 and 10 mm.

5. The device according to claim 1, wherein the first impact tools have a dovetail profile and the second impact tools are fixed in a groove of a guide rail.

6. A method for separating a composite material using a device according to claim 1, comprising:
   (a) crushing the parts of the composite material into smaller pieces;
   (b) introducing the pieces into the ring space between the rotor and the stator;
   (c) subjecting the pieces briefly to strong forces by pressure changes which arise between the first tools of the rotating rotor and the second tools of the stator, whereby layers of the composite material are separated from one another by shear forces; and
   (d) introducing compressed air into the device at a top of the device, whereby dwell time of the pieces in the ring space is controlled.

7. The device according to claim 1, wherein the distance between the first impact tools and the second impact tools is between 5 and 8 mm.

* * * * *